No. 762,388. Patented June 14, 1904.

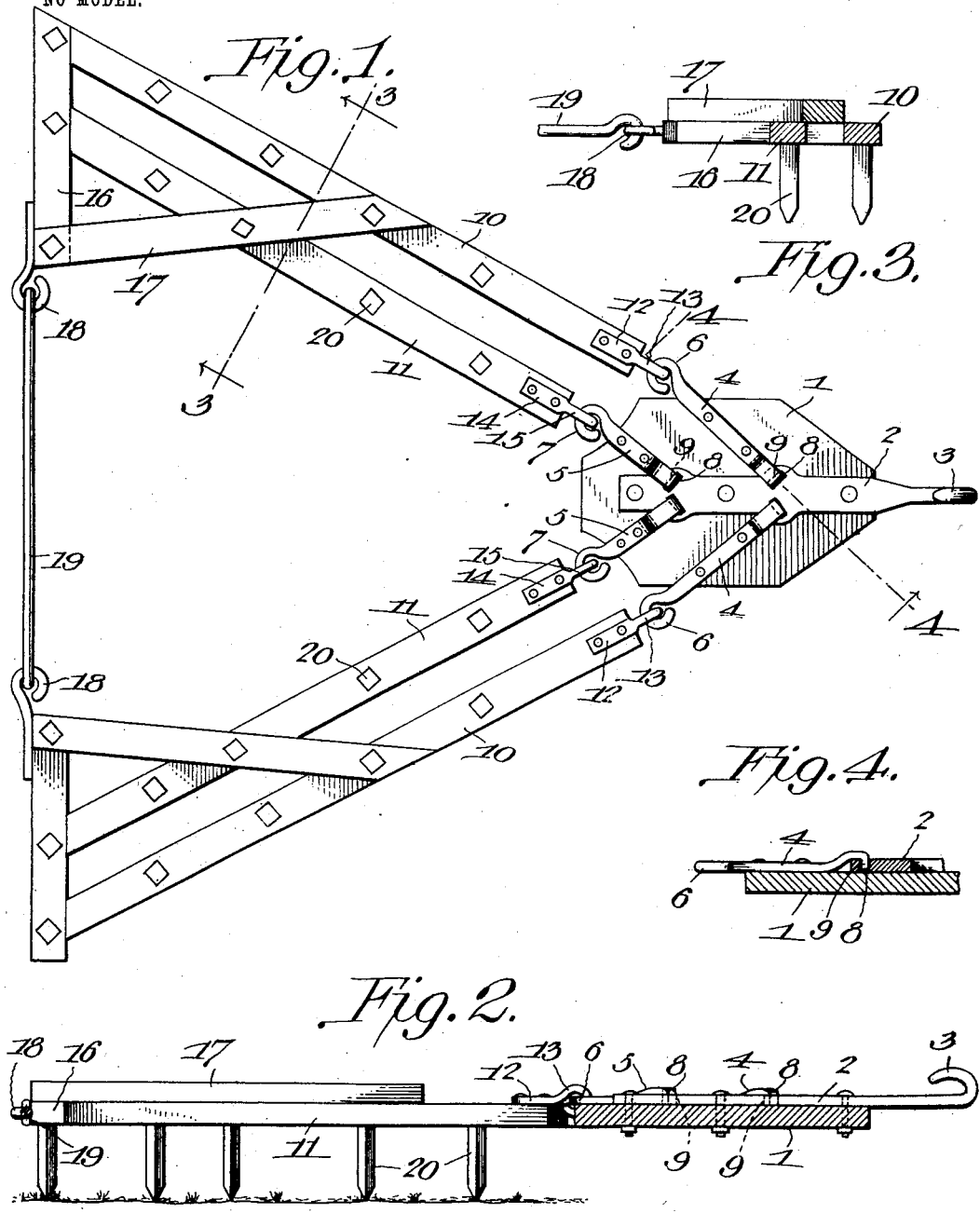

UNITED STATES PATENT OFFICE.

JAMES F. CROSS, OF COLUMBUS, ARKANSAS.

HARROW.

SPECIFICATION forming part of Letters Patent No. 762,388, dated June 14, 1904.

Application filed March 8, 1904. Serial No. 197,162. (No model.)

*To all whom it may concern:*

Be it known that I, JAMES F. CROSS, a citizen of the United States, residing at Columbus, in the county of Hempstead and State of Arkansas, have invented a new and useful Harrow, of which the following is a specification.

This invention relates to harrows; and it has for its object to provide a cultivating implement of this class which shall be especially adapted for cultivating between the rows or beds of cotton and similar crops.

A further object of the invention is to provide a device of the class referred to which shall possess superior advantages in point of simplicity, durability, and general efficiency.

With these and other ends in view the invention consists in the improved construction, arrangement, and combination of parts, which will be hereinafter fully described, and particularly pointed out in the claims.

In the accompanying drawings has been illustrated a simple and preferred form of embodiment of my invention, it being understood, however, that I do not necessarily limit myself to the precise structural details therein exhibited, but reserve the right to any changes, alterations, and modifications which may be resorted to within the scope of my invention and without departing from the spirit or sacrificing the utility of the same.

In said drawings, Figure 1 is a top plan view of a harrow constructed in accordance with the principles of my invention. Fig. 2 is a longitudinal sectional view of the same. Fig. 3 is a transverse sectional detail view taken on the line 3 3 in Fig. 1. Fig. 4 is a sectional detail view taken on the line 4 4 in Fig. 1.

Corresponding parts in the several figures are indicated by similar numerals of reference.

In the construction of my improved harrow I employ a front member or block 1, to the upper side of which is attached a strap 2, terminating at its front end in a draft-hook 3. Additional straps 4 4 and 5 5, bolted or otherwise secured to the upper side of the block 1, extend obliquely in a rearward direction and terminate at their outer or rear ends in hooks 6 6 and 7 7. The inner ends of the straps 4 4 and 5 5 may be provided with downwardly-extending lugs 8, engaging recesses or perforations 9 in the central strap 2, with which the said auxiliary hooked straps 4 4 and 5 5 are thus individually connected irrespective of their connection with the wooden block 1, and thus forming a connection or attachment which is possessed of great strength. The wooden block 1 thus acts in the capacity of a supporting device, beyond the edges of which the hooked ends of the strap members 4 and 5 are extended, as will be readily seen.

The sides of the harrow are composed each of a pair of parallel bars 10 and 11, the front bar on each side being designated 10 and the rear bar 11. The side bars 10 are provided at their front ends with straps 12, terminating in hook members 13, engaging the hook members 6 of the straps 4. In like manner the rear bars 11 are provided at their front ends with straps 14, terminating at their front ends in hooks 15, engaging the hooks 7 of the straps 5. The bars 10 11 of each harrow side or section are connected at their rear ends by a cross-piece 16, which extends inwardly in the direction of the longitudinal center of the harrow, and obliquely-disposed braces 17 extend from the inner end of the cross-piece 16 across the bars 11 to the bars 10, near the front end of the latter, said obliquely-disposed braces being firmly bolted or otherwise secured to each of the bars 16, 11, and 10, which are thus firmly connected and braced together.

The inner ends of the cross-pieces 16 are provided with hook members 18, and said hook members are connected by means of a link 19, which while it serves to connect the harrow-sections enables the said sections to move flexibly and independently of each other, so as to engage the ground between the ridges or beds of the plants that are to be cultivated.

The harrow-sections are provided with teeth or earth-engaging implements, which may be of any suitable construction. In the drawings ordinary harrow-teeth (designated 20) have been shown.

The operation and advantages of this device will be readily understood from the foregoing description, taken in connection with the drawings hereto annexed. The implement is in operation dragged over the ground between the rows by draft attached to the hook 3 at the front end of the strap 2. The side members of the harrow will yield upwardly at their outer or free ends and will thus engage the sides of the ridges, uprooting grass, weeds, and the like and stirring the soil without injury to the crops. The side members of the harrow are properly spaced at their rear ends by the link 19, as will be readily understood.

The construction of the device is extremely simple and inexpensive, and the device is at the same time, owing to the peculiar construction herein described, possessed of great strength, whereby it is enabled to successfully resist any wear or strain to which it may in practice be subjected.

Having thus described my invention, I claim—

1. In a cultivating implement, a supporting-block, a strap mounted longitudinally upon said block and terminating in a hook at its front end, rearwardly-diverging strap members extending beyond the edges of the supporting-block and terminating in hook members at their outer ends, and frames carrying earth-engaging implements, each of said frames comprising a pair of parallel bars provided at their front ends with hook members engaging the hooks of the rearwardly-diverging straps upon the supporting-block, cross-pieces connecting the rear ends of said parallel bars and extending inwardly from the same and braces extending from the inner ends of said connecting-bars across the parallel bars, hooks at the inner ends of the cross-pieces, and a link connecting said hooks.

2. In a device of the class described, a supporting-block, a longitudinally-disposed strap upon the same having a hook at its front end, rearwardly-diverging strap members mounted upon the supporting member and having lugs at their inner ends engaging recesses in the central longitudinal strap member and hooks at their outer ends, and frames carrying earth-engaging implements, said frames including parallel bars provided at their front ends with hooks engaging the hooks of the rearwardly-diverging strap members upon the supporting-block.

In testimony that I claim the foregoing as my own I have hereto affixed my signature in the presence of two witnesses.

JAMES F. CROSS.

Witnesses:
R. C. STUART, Jr.,
J. R. AUBREY.